(12) United States Patent
Gloeckner et al.

(10) Patent No.: US 9,068,593 B2
(45) Date of Patent: Jun. 30, 2015

(54) ROLLING BEARING ARRANGEMENT

(75) Inventors: Peter Gloeckner, Schweinfurt (DE); Andreas Kaiser, Werneck (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/512,911

(22) PCT Filed: Nov. 25, 2010

(86) PCT No.: PCT/EP2010/068176
§ 371 (c)(1),
(2), (4) Date: May 31, 2012

(87) PCT Pub. No.: WO2011/067154
PCT Pub. Date: Jun. 9, 2011

(65) Prior Publication Data
US 2012/0328226 A1    Dec. 27, 2012

(30) Foreign Application Priority Data
Dec. 2, 2009 (DE) .......................... 10 2009 056 662

(51) Int. Cl.
*F16C 19/00* (2006.01)
*F16C 19/50* (2006.01)
*F16C 27/04* (2006.01)
*F16C 37/00* (2006.01)

(52) U.S. Cl.
CPC ............ *F16C 27/045* (2013.01); *F16C 37/007* (2013.01)

(58) Field of Classification Search
USPC .......... 384/99, 313, 316, 317, 321, 462, 467, 384/476, 490, 493, 535, 557, 581, 900
See application file for complete search history.

(56) References Cited

U.S. PATENT DOCUMENTS

| | | | | |
|---|---|---|---|---|
| 2,826,463 A | * | 3/1958 | Newman | 384/321 |
| 3,456,992 A | * | 7/1969 | Kulina | 384/100 |
| 3,698,777 A | | 10/1972 | McCoy | |
| 3,836,215 A | * | 9/1974 | Dopkin et al. | 384/99 |
| 3,844,630 A | | 10/1974 | Lechner | |

(Continued)

FOREIGN PATENT DOCUMENTS

| | | |
|---|---|---|
| DE | 36 04 625 A1 | 8/1987 |
| DE | 103 22 631 A1 | 12/2004 |

(Continued)

OTHER PUBLICATIONS

DE 10322631 A1—Machine Translation.*

*Primary Examiner* — Marcus Charles
*Assistant Examiner* — Yamilka Pinero Medina
(74) *Attorney, Agent, or Firm* — Simpson & Simpson, PLLC (57) ABSTRACT

A rolling bearing arrangement which has at least one rolling bearing outer ring of a rolling bearing, an intermediate element, and a housing part. The rolling bearing can be inserted into the housing part such that the intermediate element lies between the rolling bearing outer ring and the housing part. A first contact zone is formed between the rolling bearing outer ring and the intermediate element, and a second contact zone is formed between the intermediate element and the housing part. Formed on the first contact zone is a cooling system that has at least one cooling recess through which a cooling agent can flow. Formed on the second contact zone is a damping system that has at least one damping recess via which a damping cavity in the second contact zone can be filled with a damping medium.

26 Claims, 10 Drawing Sheets

(56) References Cited

U.S. PATENT DOCUMENTS

| | | | |
|---|---|---|---|
| 4,440,456 A * | 4/1984 | Klusman | 384/582 |
| 4,527,912 A * | 7/1985 | Klusman | 384/99 |
| 4,547,083 A * | 10/1985 | Horler | 384/535 |
| 4,596,476 A * | 6/1986 | Schill et al. | 384/467 |
| 4,602,874 A * | 7/1986 | Neugebauer | 384/476 |
| 4,669,893 A | 6/1987 | Chalaire | |
| 4,838,028 A * | 6/1989 | Witt | 60/736 |
| 5,071,262 A * | 12/1991 | Monzel et al. | 384/99 |
| 5,080,499 A * | 1/1992 | Klusman et al. | 384/99 |
| 5,344,239 A * | 9/1994 | Stallone et al. | 384/99 |
| 5,797,684 A * | 8/1998 | Becker | 384/99 |
| 5,803,612 A * | 9/1998 | Battig | 384/99 |
| 6,293,703 B1 * | 9/2001 | Date | 384/476 |
| 6,913,390 B2 * | 7/2005 | Inoue et al. | 384/476 |
| 8,459,932 B2 | 6/2013 | Nakano et al. | |
| 2009/0263067 A1 * | 10/2009 | Streit et al. | 384/618 |
| 2011/0142386 A1 * | 6/2011 | Flouros | 384/321 |

FOREIGN PATENT DOCUMENTS

| | | |
|---|---|---|
| DE | 10 2006 024 603 A1 | 11/2007 |
| DE | 10 2008 032 921 A1 | 1/2010 |
| GB | 2 111 136 A | 6/1983 |
| JP | 48110551 | 12/1973 |
| JP | 09294351 | 11/1997 |
| JP | 2003083325 A | 3/2003 |
| WO | 2008020483 A1 | 2/2008 |

* cited by examiner

ROLLING BEARING ARRANGEMENT

CROSS-REFERENCE TO RELATED APPLICATIONS

This application is the United States national stage application pursuant to 35 U.S.C. §371 of International Application No. PCT/EP2010/068176, filed on Nov. 25, 2010, which application claims priority of German Patent Application No. 10 2009 056 662.7, filed on Dec. 2, 2009, which applications are incorporated herein by reference in their entireties.

TECHNICAL FIELD

The invention pertains to the field of heavy-duty rolling bearings, in particular for use in jet engine bearings or mainshaft bearings in high-speed gas turbines or gearboxes and also, for example, for rotor bearings in helicopters.

BACKGROUND OF THE INVENTION

When rolling bearings are used in such applications, operating temperatures far in excess of 200° C. easily arise in a contact region between rolling bodies and bearing rings of such bearings on account of very high operating speeds combined with extremely high loadings. The heat generated by friction power at the high numbers of revolutions must be reliably and rapidly dissipated in order to avoid bearing damage. For this purpose, use is made of rolling bearing cooling systems.

DE 10 2006 024 603 A1 discloses a cooling system for such an application. An outer lateral surface of an outer ring of such a rolling bearing is provided with a plurality of recesses for the throughflow of a coolant of a coolant system. Consequently, the heat generated between rolling bearing outer ring and rolling bodies on account of the friction power at the extraordinarily high numbers of revolutions is dissipated, In described applications of heavy-duty rolling bearings, there also occur at the same time axial and radial vibrations which may, under certain circumstances, have a disruptive influence on an operation of the rolling bearing. Situations such as these may entail an increase in damages right up to the destruction of the rolling bearing, inter glia resulting from a radial vibration-induced rotation of the rolling bearing against a housing or from the rolling bearing running onto a housing part.

In order to counteract any vibration-induced damage, today's rolling bearings and bearing systems are equipped, for example, with suitable damping systems which allow operation-induced vibrations in the rolling bearing to be attenuated.

Such known damping systems sometimes involve technically complicated solutions whereby damping is achieved by means of a sometimes quite complex arrangement of mechanical damping elements.

DE 10 2008 032 921 A1 discloses a further damping system for a rolling bearing. This known rolling bearing with damping system has a cavity-forming housing part and a bearing module which is inserted in the cavity and which comprises an outer bearing ring and an inner bearing ring which is arranged therein and is mounted such that it can rotate about an axis of rotation relative to the outer bearing ring. Provision is made here for the outer bearing ring to be inserted, along an outer contour, into the cavity with an accurate fit up to the cavity wall, apart from an encircling gap, with the outer contour of the outer bearing ring and the cavity wall being designed to be locked against mutual rotation, and with the gap being filled with a high-viscosity damping liquid.

Various configurations of this (in this case contact-free) rotational locking between outer bearing ring and cavity wall, or housing part, obtained by shaping are discussed in DE 10 2008 032 921 A1. Other types of rotational locking mechanisms in rolling bearings in general, for example mechanical rotational locking mechanisms, are known.

SUMMARY OF THE INVENTION

According to aspects illustrated herein, there is provided a rolling bearing arrangement including a housing; a roller bearing arranged within the housing, the roller bearing including an outer ring; a unitary intermediate element arranged between the outer ring and the housing, the unitary intermediate element pressed onto the outer ring and forming a gap with the housing, the gap operatively arranged to provide a rotational locking between the housing and the unitary intermediate element; a cooling recess operatively arranged within the unitary intermediate element and contacting the outer ring; and, a damping recess operatively arranged within the housing proximate the gap.

According to aspects illustrated herein, there is provided a rolling bearing arrangement including a housing; a roller bearing arranged within the housing, the roller bearing including an outer ring; a unitary intermediate element arranged between the outer ring and the housing, the unitary intermediate element pressed onto the outer ring and forming a gap with the housing, the gap operatively arranged to provide a rotational locking between the housing and the unitary intermediate element; a cooling recess operatively arranged within the rolling bearing outer ring and contacting the unitary intermediate element; and, a damping recess operatively arranged within the housing and contacting the unitary intermediate element.

According to aspects illustrated herein, there is provided a rolling bearing arrangement including a housing; a roller bearing arranged within the housing, the roller bearing including an outer ring; a unitary intermediate element arranged between the outer ring and the housing, the unitary intermediate element pressed onto the outer ring and forming a gap with the housing, the gap operatively arranged to provide a rotational locking between the housing and the unitary intermediate element; a cooling recess operatively arranged within the rolling bearing outer ring and contacting the unitary intermediate element; and, a damping recess operatively arranged within the unitary intermediate element proximate the housing.

According to aspects illustrated herein, there is provided a rolling bearing arrangement including a housing; a roller bearing arranged within the housing, the roller bearing including an outer ring; a unitary intermediate element arranged between the outer ring and the housing, the unitary intermediate element pressed onto the outer ring and forming a gap with the housing, the gap operatively arranged to provide a rotational locking between the housing and the unitary intermediate element; a cooling recess operatively arranged within the unitary intermediate element and contacting the outer ring; and, a damping recess operatively arranged within the unitary intermediate element proximate the housing.

Against this background, the object of the present invention is to provide a rolling bearing that meets the aforementioned requirements of effective cooling and damping and can be produced in a constructionally simple and cost-effective manner.

This object is achieved according to the invention by means of a rolling bearing arrangement and also by means of an intermediate element for such a rolling bearing arrangement according to the respective independent patent claim.

This rolling bearing arrangement has at least one rolling bearing outer ring of a rolling bearing, an intermediate element and a housing part, wherein the rolling bearing can be inserted into the housing part such that the intermediate element is arranged between the rolling bearing outer ring and the housing part, wherein a first contact zone is formed between the rolling bearing outer ring and the intermediate element, and a second contact zone is formed between the intermediate element and the housing part.

A cooling system is formed on the first contact zone, the cooling system having at least one cooling recess, in particular a cooling channel, through which a coolant can flow.

A damping system is formed on the second contact zone, the damping system having at least one damping recess via which a damping cavity, for example a gap, in the second contact zone can be filled with a damping medium.

In the case of an intermediate element for such a rolling bearing arrangement that can be arranged between a rolling bearing outer ring and a housing part, a first contact zone can be formed between the rolling bearing outer ring and the intermediate element, and a second contact zone can be formed between the intermediate element and the housing part.

A cooling system is formed on the first contact zone, the cooling system having at least one cooling recess, in particular a cooling channel, which is arranged on the intermediate element and through which a coolant can flow.

A damping system is formed on the second contact zone, the damping system having at least one damping recess which is arranged on the intermediate element and via which a damping cavity, for example, a gap, in the second contact zone can be filled with a damping medium.

An essential advantage of the invention is that two different functions, that is to say the cooling and also the damping of a rolling bearing, can be realized in a simple manner. In particular, the use of the intermediate element according to the invention makes it possible to achieve an integrated, combined cooling-damping system in a rolling bearing.

Moreover, one advantage of the invention is that, in the functional area of damping, the damping recess provided according to the invention makes it possible to achieve a uniform distribution of the damping medium, for example, a high-viscosity liquid such as an appropriate oil, in the damping cavity or gap. This results in a uniform damping pressure or film building up in the damping cavity (improved or uniform damping pressure distribution), which, in addition to the damping effect achieved thereby, also has the effect of centering the intermediate element or the rolling bearing in the housing part.

Furthermore, by virtue of the uniform damping medium flow that can be achieved, and hence by virtue of the thereby enabled additional discharge of the frictional heat, the invention advantageously produces, in addition to that produced by the cooling system on the first contact zone, an additional cooling of the rolling bearing.

In one preferred configuration, the damping recess may be formed by at least one groove which runs around in the housing part and/or in the intermediate element. It is further possible for the damping recess to be produced in a configuration as at least one pocket arranged in the housing part and/or in the intermediate element. Preference is given here for there to be incorporated, uniformly in the circumferential direction, a plurality of such pockets in the housing part and/or in the intermediate element.

The damping medium is preferably a damping fluid or damping liquid, in particular a high-viscosity liquid, for example a suitable oil. The higher the viscosity of the damping liquid, the greater customarily is the damping that can be achieved. The particular damping liquid and the particular viscosity thereof that is ultimately selected essentially depends on the area of application of the bearing system. Examples of factors that come into consideration here are, for example, the operating temperatures achieved, the type of the environmental medium, a rotational speed loading to which the bearing or bearing module is subjected, a desired damping capacity, etc. The same correspondingly applies to the coolant, with a cooling oil preferably being used therefor.

As regards the filling of the damping cavity or gap with the damping medium, in particular with the damping liquid, provision can be made in principle for the damping liquid to remain statically in the damping cavity or gap, that is to say, in particular, to make provision for no dynamic exchange or throughflow of the damping liquid. For this purpose, the damping cavity is sealed off in relation to the environment using, for example, suitable sealing elements, for example sealing rings, which can be fitted into grooves in the outer circumference of the intermediate element and/or into grooves provided on the inner circumference of the housing part.

However, it is often advantageous for the damping cavity in the aforementioned sense not to be filled constantly with the damping liquid, but, for example, to provide for a controlled throughflow of the damping liquid.

For this purpose, in a preferred configurational variant, a number of inlets corresponding to a number of the damping recesses is incorporated into the housing part and/or the intermediate element, wherein the damping liquid is introduced, via the or each inlet, into the damping cavity or gap under pressure and, in particular, at a constant rate.

The term "rate" as discussed here is the rate of damping liquid and can be defined both in terms of liquid mass and liquid volume. The inlets are incorporated into the housing part and/or intermediate element, for example, in the form of channels, bores or simple openings. The damping liquid is pumped into the damping cavity in a targeted manner via the corresponding inlets, with the result that a constant rate or quantity of damping liquid is flushed through said damping cavity in a targeted manner in each instance.

To provide an outlet for the damping liquid, a suitable outlet or suitable outlets are provided, for example, likewise taking the form of channels, bores or simple openings incorporated into the housing part and/or intermediate element. It is thereby possible for a damping liquid circuit, which also assists in cooling the bearing or bearing module, to be realized by the inlets and the outlets. This variant is of particular interest especially when considered from an economic view. Alternatively, however, provision can also be made to implement a controlled leakage of damping liquid, for example, by means of slotted sealing or blocking rings. In this case, the damping liquid can be drained off, for example, into an oil pan, also known as an oil sump.

The damping liquid is introduced into the damping cavity or gap at a constant rate via the inlet or inlets, i.e. particularly such that the quantity of damping liquid in the damping cavity or gap is maintained constant. To achieve this, the individual inlet or inlet(s) comprise(s), for example, suitable nozzles. The result of introducing the constant quantity of damping liquid into the gap is a restriction of the gap resulting from a rotation, leading to an automatic local increase of the pressure in the damping liquid, thereby with any constructional gap finally being counteracted. Finally, in this configurational variant, in particular, the contact-free bearing and also an automatic centering of the rolling bearing are further facilitated.

The, as preferably envisionable, introduction of the damping liquid via the pockets incorporated in the housing part and/or in the intermediate element means that the damping liquid is not introduced directly into the damping cavity or gap, but instead is first of all fed into the corresponding pockets in a similar manner to a hydrostatic bearing. Here, each of the pockets can be fed with damping liquid by way of an individual inlet. Alternatively, provision can also be made for each of the pockets to be fed with the damping liquid by way of any desired number of inlets.

The pockets are expediently arranged with uniform distribution along the gap. A delivery pressure for the damping liquid builds up in the pockets, which are essentially permeable only in relation to the gap, with the final result that a corresponding delivery of the damping liquid via the pockets into the gap is advantageously ensured.

It is preferable to be able to regulate a flow of damping liquid through the or each inlet. The damping liquid throughflow, or "throughflow" for short, is defined in particular as the quantity of damping liquid that flows through a throughflow cross-section of the inlet opening per unit time. Here, the quantity can be defined both in terms of liquid mass and liquid volume. The throughflow is expediently regulated by means of an appropriate flow limiter. Flow limiters are used in various technical fields, which means that a tried and tested technique can be adopted here. An appropriate flow limiter is sometimes able to operate under a very high system pressure, for example, 100 bar. Such a system pressure makes it possible to ensure the desired throughflow even when the bearing module is subjected to a very high operating load. In general, it holds that the throughflow is correlated with a flow velocity of the delivered damping liquid, and hence finally with a hydrodynamic pressure of said liquid. Therefore, it is possible using the throughflow rate to be able finally to regulate a pressure of the damping liquid in the gap, with the final result that the degree of damping can be regulated.

A throughflow quantity can also preferably be regulated with a view to cooling the bearing and/or the housing part. Rolling bearings, which run in particular under a high operating load, generally require sufficient cooling. Advantageous in this embodiment is the fact that the throughflow rate of damping liquid particularly also varies with a view to, in addition to that provided by the cooling system on the first contact zone, an additional cooling of the bearing module. The greater the required cooling, the higher must be selected the throughflow rate here. It is thus possible overall, through the regulation of the throughflow rate, for both the degree of damping and the cooling of the bearing module to be controlled in a targeted manner. The flow through the individual inlets here is expediently kept constant in each case.

It is advantageous for there to be a substantial correspondence between the individual flows of damping liquid passing through the individual inlets. This makes it possible in a simple manner to achieve, in particular, a constant quantity of damping liquid in the corresponding gap. This results, as it were, in a "hydrostatic bearing" of the bearing module in the cavity.

Provision can preferably be made for the cooling recess to be at least one groove, in particular, a spiral groove, arranged in the rolling bearing outer ring and/or in the intermediate element.

Furthermore, it is advantageous for at least one coolant inlet and one coolant outlet to be arranged in the rolling bearing outer ring and/or the intermediate element, the inlet and outlet being in a throughflow connection with the cooling recess. It can be particularly advantageous here for the coolant inlet and the coolant outlet to be arranged on the intermediate element, with the result that the coolant can flow through the cooling recess in the form of a spiral groove that is formed on the intermediate element.

The regulation used for the coolant throughflow rate may correspondingly, as described above, be used for the damping medium.

Such a combined damping-cooling system as in the case of the invention makes it possible, in particular, for the rolling bearing arrangement according to the invention preferably to be able to be employed for use in a heavy-duty rolling bearing, in particular, in a main-shaft bearing in high-speed gas turbines or gearboxes, or for rotor bearings in helicopters.

In a further configuration of the invention, provision can be made to design, with mutual rotational locking, an outer contour of the intermediate element and an inner contour, or cavity wall, of the housing part, in which inner contour or cavity wall the intermediate element is inserted, apart from the damping cavity or the gap, with an accurate fit. For this purpose, the intermediate element and the cavity wall are designed in particular to have a "rotationally locking shape."

What this means then is that any rotation of the intermediate element relative to the housing part would be automatically and solely "mechanically" stopped by the cavity wall. For this purpose, the outer contour of the intermediate element and the cavity wall may have, in particular, a nonround shape. To achieve such a nonround shape, the outer contour has, for example, radial protuberances which engage in complementarily formed indentations in the cavity wall. It is also possible for the outer contour and the cavity wall to be designed in an alternative shape, for example, in an oval shape or in a star shape.

In an advantageous configuration, the outer contour and the cavity wall are each provided as a polygonal shape. This can be achieved in a particularly simple manner from a production engineering point of view.

The rotationally locking effect per se is already ensured solely through the shaping of the housing part and the outer element. Filling the gap with the, preferably high-viscosity, damping liquid additionally also achieves a rotational locking in the sense of a contact-free rotational locking This can be particularly explained thus: any rotation of the outer element in the cavity would lead, as a result of the "rotationally locking shapes" of the cavity wall and the outer contour, to a local restriction of the gap. This in turn would result in particular in a local increase of the pressure in the, preferably high-viscosity, damping liquid, thereby finally counteracting any constriction of the gap. Consequently, it is finally possible to achieve a substantially constant gap width for the gap. This means, on the one hand that any "mechanical" contact between the outer element and the cavity wall can be prevented by means of the liquid-filled gap. On the other hand, an automatic centering of the bearing module in the cavity of the housing part can thus be achieved. What is thus made available is a contact-free rotational locking and at the same time a contact-free, and in particular also centering, bearing of the bearing module in the housing part.

Further types of rotational locking systems using an alternative fastening of the intermediate element to the housing part, for example, by means of a flanged connection, are possible and generally known.

BRIEF DESCRIPTION OF THE SEVERAL VIEWS OF THE DRAWINGS

Illustrative embodiments of the invention will be described herein below with reference to the figures, in which.

DETAILED DESCRIPTION OF THE INVENTION

Figure 1:
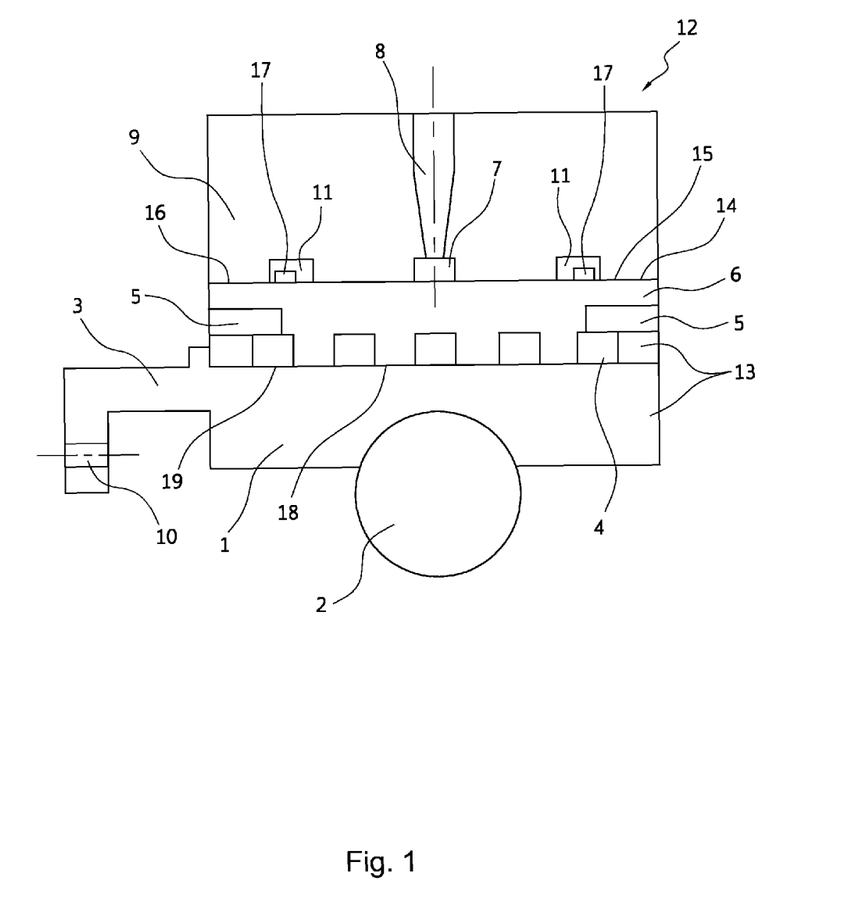
FIG. 1 shows a detail of a bearing system in a cross-sectional view according to one illustrative embodiment.

FIG. 1 depicts, in an axial cross-section, a rolling bearing arrangement or (in the following text) a bearing system 12 comprising a combined cooling-damping system. The bearing system 12 is particularly intended in the context of a jet engine bearing.

As shown in the illustration, the bearing system 12 comprises a bearing module 13, which consists of a rolling bearing (represented by way of a rolling body 2 and a rolling bearing outer ring 1) and of a surrounding ring 6, and also a housing part 9. The bearing module 13 or the surrounding ring 6 here is inserted into a cavity 14 in the housing part 9. The bearing module 13 itself comprises, as shown, a rolling bearing outer ring 1 and also a rolling body 2, with the surrounding ring 6 being pressed onto said rolling bearing outer ring 1. The rolling bearing outer ring 1 is further designed to have spring bars 3 or a flange 3 which has a flange bore 10.

As is revealed by FIG. 1, the surrounding ring 6 is inserted, along an outer contour 15, into the cavity 14 with an accurate fit up to a cavity wall 16, apart from an encircling gap 14.

The outer contour 15 of the surrounding ring 6, and also the cavity wall 16, are designed to be locked against mutual rotation (not shown). For this purpose, the outer contour 15 and the cavity wall 16 are each designed with a "rotationally locking shape."

The gap 14, which is formed between the cavity wall 16 and the outer contour 15 of the surrounding ring 6, is filled with a damping liquid and, in particular, said liquid flows through said gap. The damping liquid, inter alia, additionally makes it more difficult for the surrounding ring 6 to rotate in the cavity 14: any rotation of the surrounding ring 6 in the cavity 14 would, owing to the "rotationally locking shape," lead to a local restriction of the gap 14. Such a local restriction generally results in a local increase in the pressure in the, in particular high-viscosity, damping liquid, which finally counteracts any constriction of the gap 14. Thus, a substantially constant gap width can be achieved for the gap 14, thereby finally preventing any "mechanical" contact between the surrounding ring 6 and the cavity wall 16 and additionally allowing automatic centering of the bearing module 13 in the cavity 14.

Overall, the bearing system 12, or the surrounding ring 6, can thus be used to ensure that the bearing module 13 is damped within the housing part 9 and also to ensure contact-free rotational locking and, at the same time, contact-free, and also in particular centering, bearing of the bearing module 13 in the housing part 9.

The damping liquid is delivered via an inlet 8, which is oriented substantially in the direction of the axis of rotation and is configured as a bore in the housing part 9. The inlet opens into an encircling groove 7 incorporated in the cavity wall or in the inner contour 16 of the housing part 9.

The groove 7 finally delivers the damping liquid into the gap 14 in such a way as to ensure a hydrostatic pressure in a manner corresponding to the loading on the bearing system 12.

The inlet 8 delivers the damping liquid at a constant rate into the groove 7 in the gap 14. To provide an outlet for the damping liquid, there are provided further encircling grooves 11 which are incorporated in the cavity wall, or inner contour 16, of the housing part 9, said grooves 11 having slotted blocking rings 17 inserted therein. The result of this is to provide, a targeted leakage for the damping liquid.

In order to regulate a flow of damping liquid through the inlet 8, an appropriate flow limiter 21 is provided. The damping liquid throughflow, or "throughflow" for short, is here defined particularly as the damping liquid volume that flows through a throughflow cross-section of the inlet opening per unit time.

Flow limiter 21 (shown in FIGS. 9 and 10) makes it possible to operate under a very high system pressure of, for example, 100 bar. In particular, it is possible for such a high system pressure to ensure a selected throughflow even when the bearing module 13 is under a very high operating load, which means, in particular, that a "hydrostatic bearing" of the bearing module 13 in the cavity 14 can be achieved even under a high operating load.

A spiral cooling channel 4 is incorporated, in the form of a groove, in an inner contour 18 of the surrounding ring 6. The coolant is delivered via an inlet 5, which is designed as a bore oriented substantially coaxially to the axis of rotation. The inlet 5 opens into the cooling channel 4, via which the coolant flows into the cooling channel 4 at a constant rate. To provide an outlet for the coolant, there is provided an outlet 5, into which the cooling channel 4 again opens. This outlet 5 is likewise designed as a bore oriented substantially coaxially to the axis of rotation.

Consequently, the friction power produced as a result of the friction power at the extraordinarily high numbers of revolution is dissipated in an effective manner.

FIGS. 2 to 8 reveal further bearing systems 12 which correspond in their particular (fundamental) structure (consisting of bearing module, surrounding ring 6, housing part 9) and function (rolling bearing having combined cooling and damping) to the bearing system 12 illustrated in FIG. 1. If features of these further bearing systems 12 are not given any mention below, these features are designed to correspond to those of the bearing system 12 as per FIG. 1.

Figure 2:
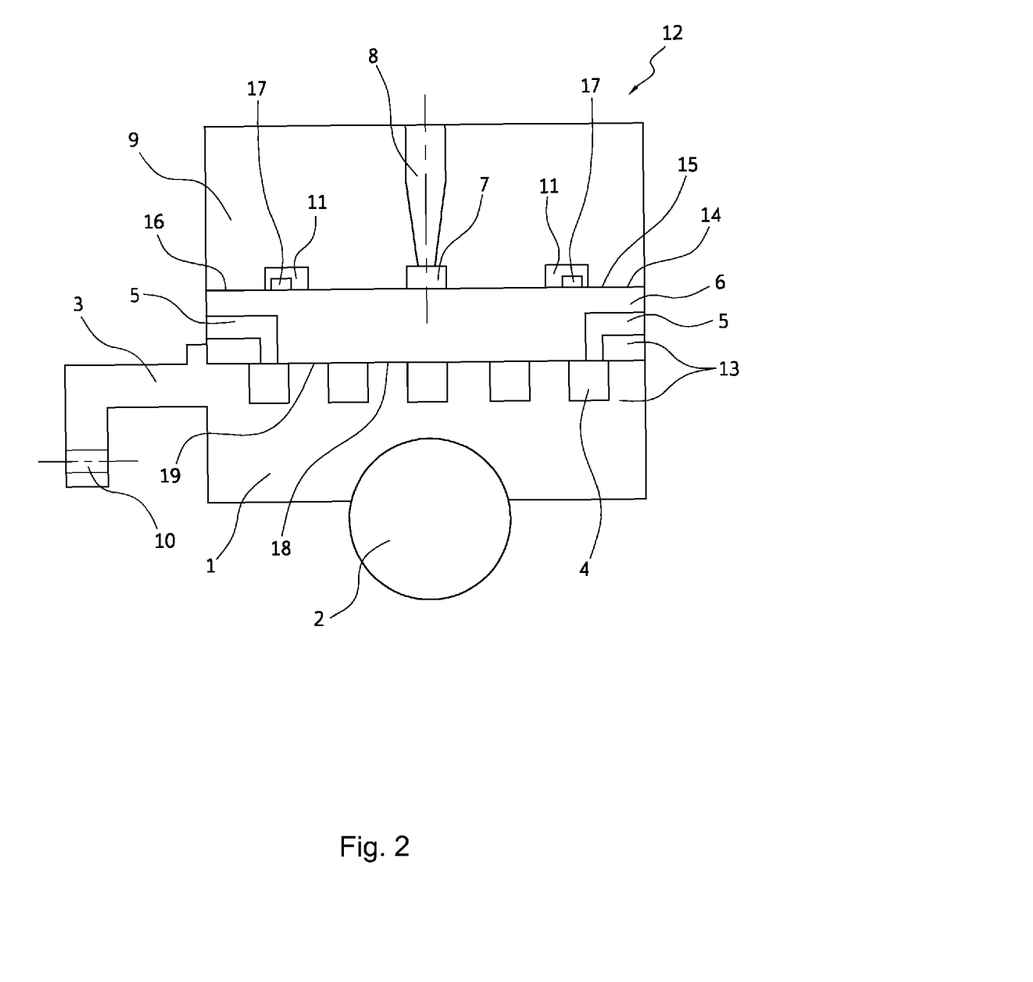
FIG. 2 shows a detail of a bearing system in a cross-sectional view according to one illustrative embodiment.

The bearing system 12 illustrated in FIG. 2 shows the rolling bearing outer ring 1, into which, according to this configuration, the spiral cooling channel 4 is incorporated. The coolant is fed in via the inlet 5 on the surrounding ring 6 and discharged via the outlet 5 on the surrounding ring 6.

Figure 3:
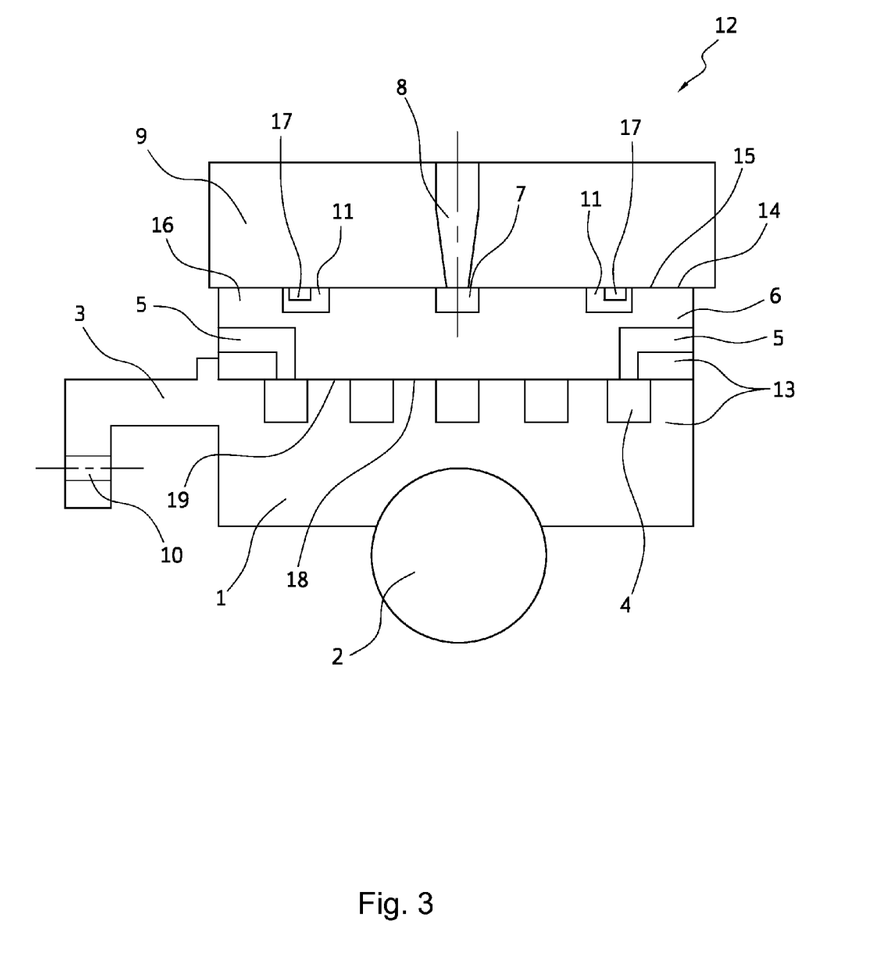
FIG. 3 shows a detail of a bearing system in a cross-sectional view according to one illustrative embodiment.

FIG. 3 shows the bearing system 12, in which the groove. 7 of the damping system and also the grooves 11 of the damping system that accommodate the blocking rings 11 are arranged in the outer contour 15 of the surrounding ring 6. Here, too, the damping liquid is delivered via the inlet 8 in the housing part 9, which inlet 8 opens in the encircling groove 7. FIG. 3 further shows the rolling bearing outer ring 1, into which, according to this configuration, the spiral cooling channel 4 is incorporated. The coolant is fed in via the inlet 5 on the surrounding ring 6 and discharged via the outlet 5 on the surrounding ring 6.

Figure 4:
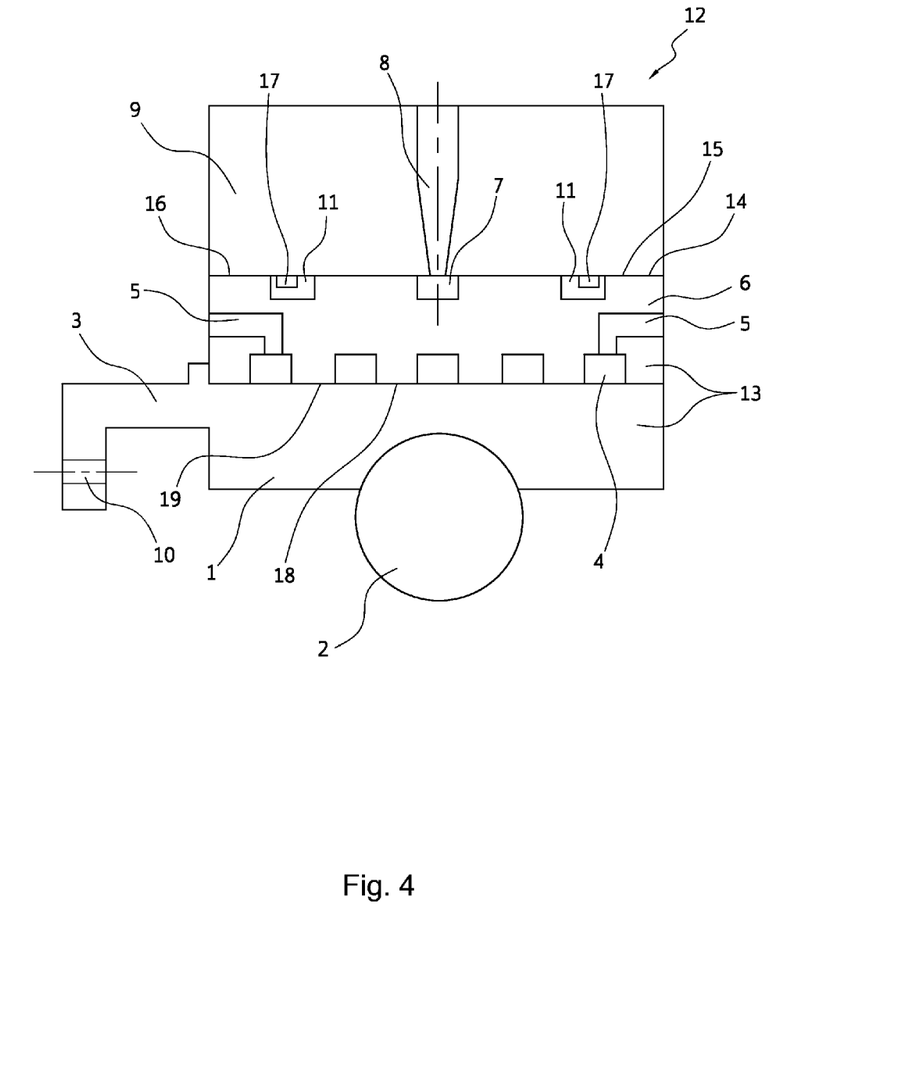
FIG. 4 shows a detail of a bearing system in a cross-sectional view according to one illustrative embodiment.

The bearing system 12 illustrated in FIG. 4 shows, according to this configuration, the surrounding ring 6, in the outer contour 15 of which are arranged the groove 7 of the damping system and also the grooves 11 of the damping system that accommodate the blocking rings 11. Here, too, the damping liquid is delivered via the inlet 8 in the housing part 9, which inlet 8 opens in the encircling groove 7.

Figure 5:
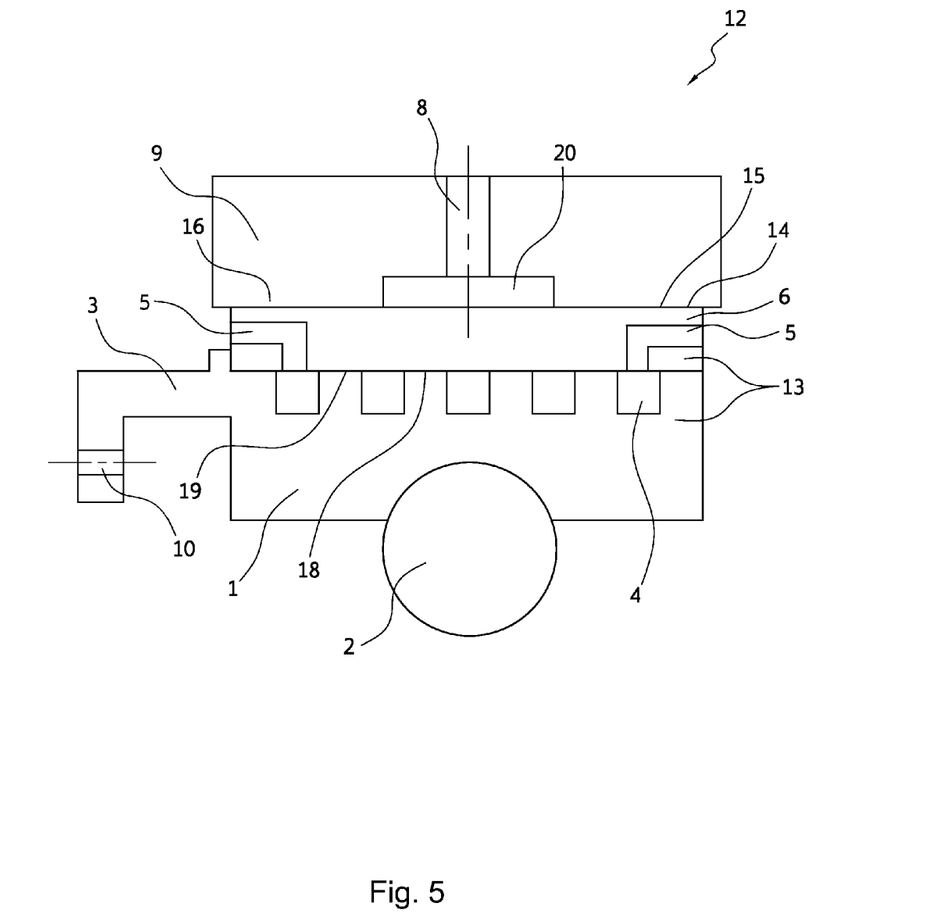
FIG. 5 shows a detail of a bearing system in a cross-sectional view according to one illustrative embodiment.
Figure 10:
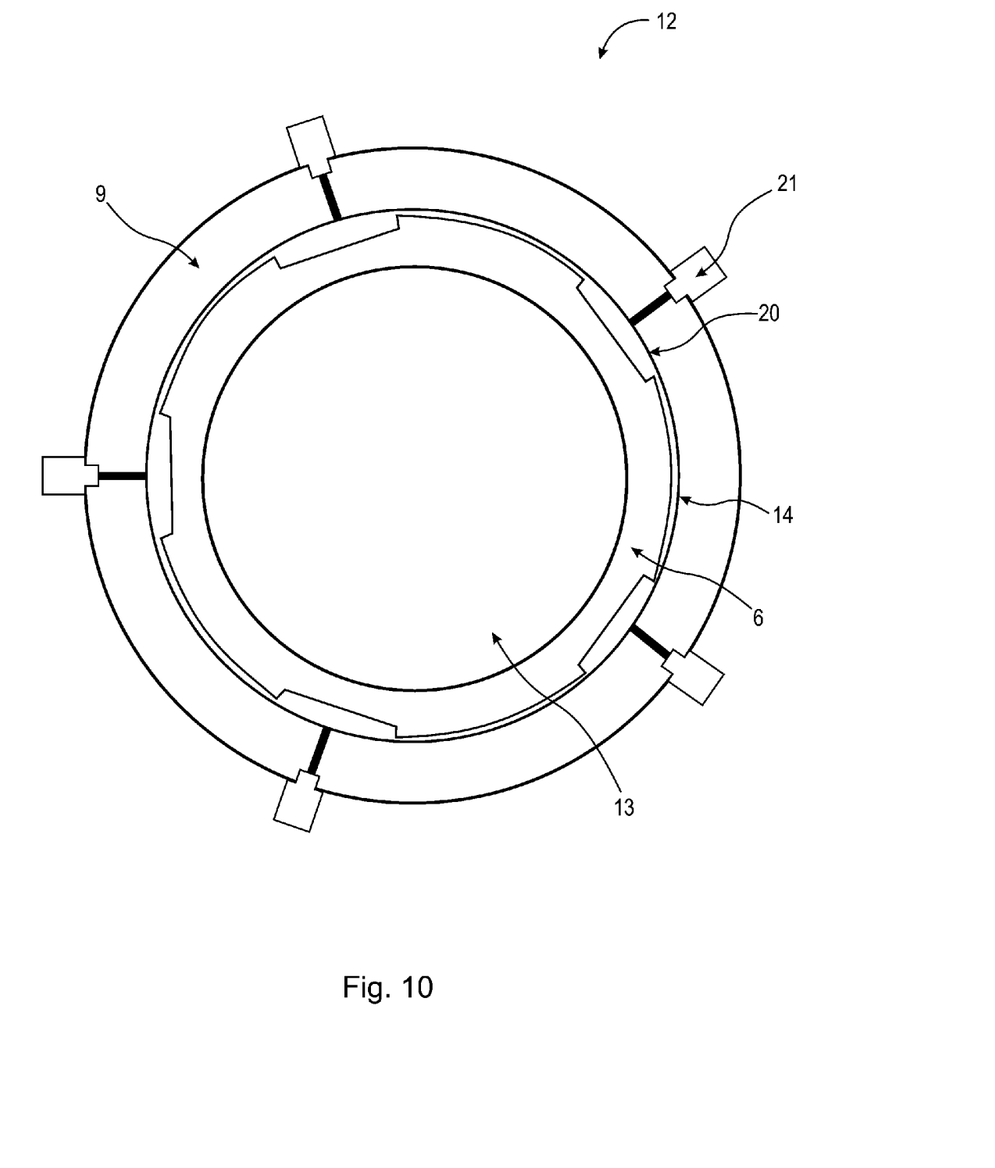
FIG. 10 shows a bearing system in a top plan view.

FIG. 5 reveals the bearing system 12 comprising the combined cooling-clamping system, in which the damping liquid flows into the gap 14 via a plurality of oil pockets 20 which are incorporated in the cavity wall or in the inner contour 16 of the housing part 9 and which are uniformly distributed in the circumferential direction. FIG. 5 shows, as a sectional view, only one such oil pocket 20, of which a plurality of, for example 4 to 6, oil pockets 20 are uniformly distributed in the circumferential direction as shown in FIG. 10. The oil pockets 20 are supplied via corresponding inlets 8 which, while corresponding in their number to the number of oil pockets 20, are formed as bores in the housing part 9 and each open in the associated oil pocket 20. Furthermore, the bearing system 12 illustrated in FIG. 5 shows the rolling bearing outer ring 1, into which, according to this configuration, the spiral cooling channel 4 is incorporated. The coolant is fed in via the inlet 5 on the surrounding ring 6 and discharged via the outlet 5 on the surrounding ring 6.

Figure 6:
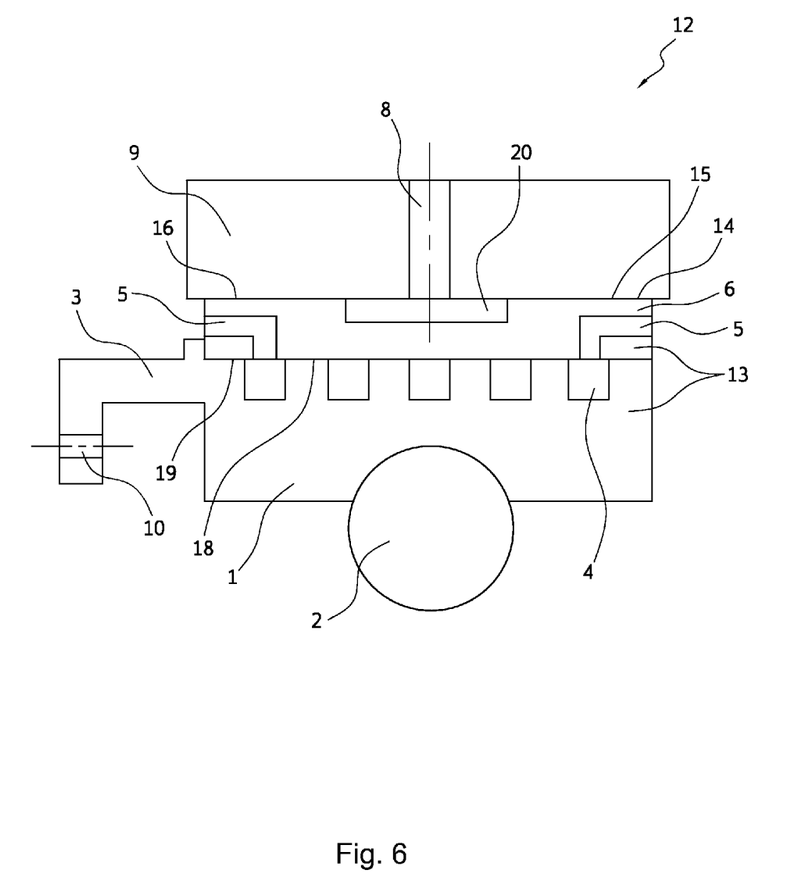
FIG. 6 shows a detail of a bearing system in a cross-sectional view according to one illustrative embodiment.

FIG. 6 shows the bearing system 12 comprising the rolling bearing outer ring 1, into which, according to this configuration, the spiral cooling channel 4 is incorporated. The coolant is fed in via the inlet 5 on the surrounding ring 6 and discharged via the outlet 5 on the surrounding ring 6. FIG. 6 further reveals that, according to this configuration, the damping liquid flows into the gap 14 via a plurality of oil pockets 20 which are incorporated in the outer contour 15 of the surrounding ring 6 and which are uniformly distributed in the circumferential direction. FIG. 6 likewise shows, as a sectional view, only one such oil pocket 20, of which a plurality (not shown) are uniformly distributed in the circumferential direction. The oil pockets 20 are supplied via corresponding inlets 8 which, while corresponding in their number to the number of oil pockets 20, are formed as bores in the housing part 9 and each open in the associated oil pocket 20.

Figure 7:
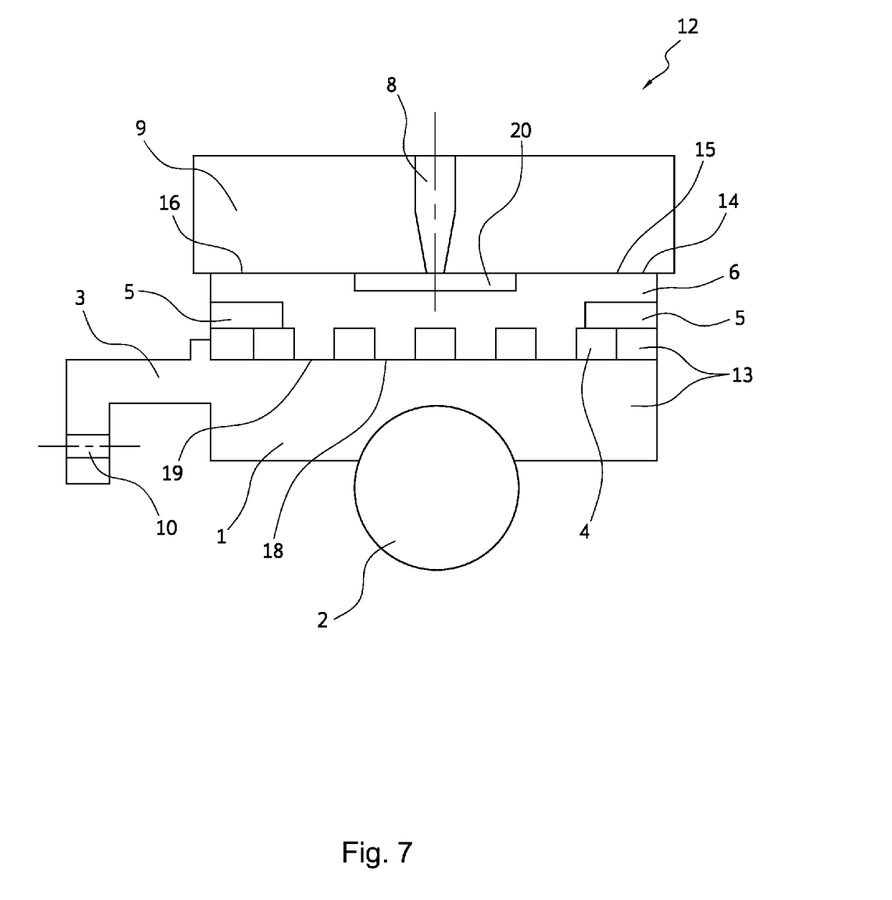
FIG. 7 shows a detail of a bearing system in a cross-sectional view according to one illustrative embodiment.

FIG. 7 reveals the bearing system 12 comprising the combined cooling-damping system in the configuration in which the damping liquid flows into the gap 14 via a plurality of oil pockets 20 which are incorporated in the outer contour 15 of the surrounding ring 6 and which are uniformly distributed in the circumferential direction. FIG. 7 likewise shows, as a sectional view, only one such oil pocket 20, of which a plurality are uniformly distributed in the circumferential direction as shown in FIG. 10. The oil pockets 20 are supplied via corresponding inlets 8 which, while corresponding in their number to the number of oil pockets 20, are formed as bores in the housing part 9 and each open in the associated oil pocket 20.

Figure 8:
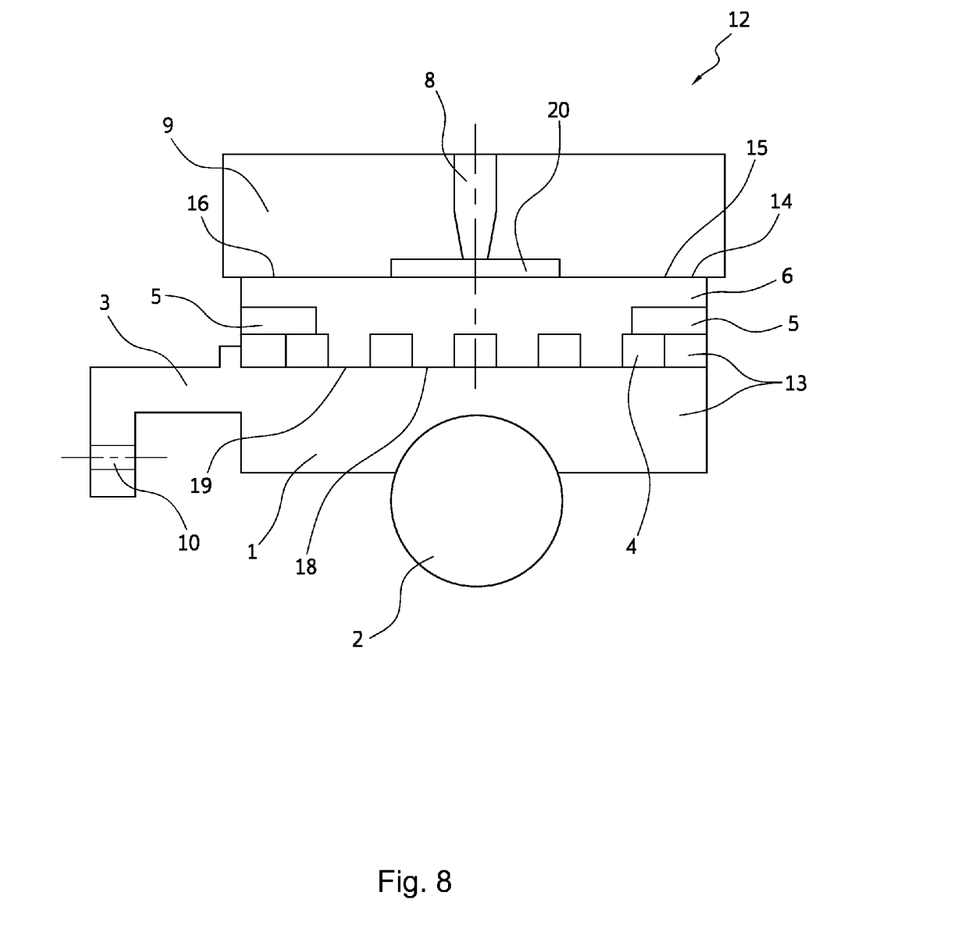
FIG. 8 shows a detail of a bearing system in a cross-sectional view according to one illustrative embodiment.

FIG. 8 shows the bearing system 12, in which the damping liquid flows into the gap 14 via a plurality of oil pockets 20 which are incorporated in the cavity wall, or in the inner contour 16, of the housing part 9 and which are uniformly distributed in the circumferential direction. FIG. 8 shows, as a sectional view, only one such oil pocket 20, of which a plurality of oil pockets 20 are uniformly distributed in the circumferential direction as shown in FIG. 10. The oil pockets 20 are supplied via corresponding inlets 8 which, while corresponding in their number to the number of oil pockets 20, are formed as bores in the housing part 9 and each open in the associated oil pocket 20.

Figure 9:
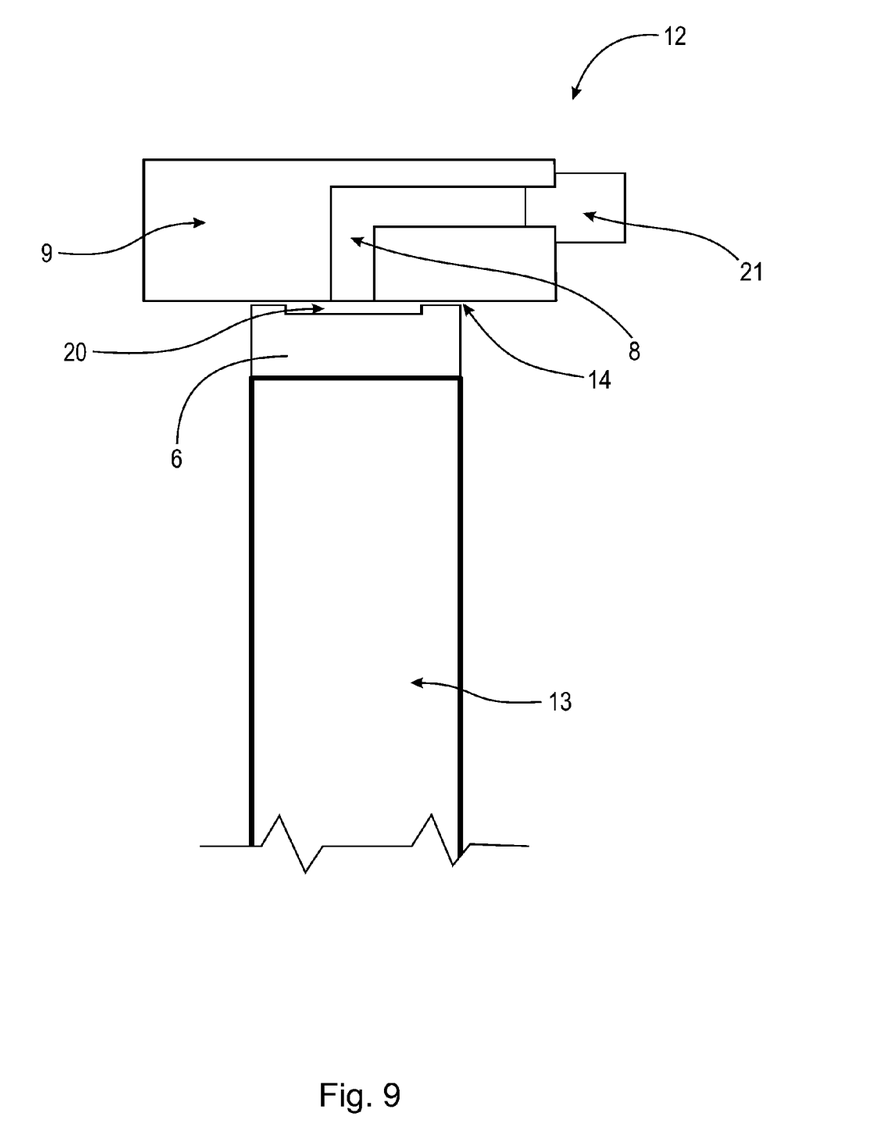
FIG. 9 shows a bearing system in a cross-sectional view.

FIG. 9 shows the bearing system 12 comprising the flow limiter 21. The surrounding ring 6 is pressed onto the bearing module 13. Damping liquid is delivered via an inlet 8 arranged within the housing part 9. Flow limiter 21 is provided to regulate a flow of damping liquid through the inlet 8.

FIG. 10 shows the bearing system 12 including a plurality of oil pockets 20 which are incorporated in the cavity wall or in the inner contour 16 of the housing part 9 and which are uniformly distributed in the circumferential direction.

Referring to FIG. 1, in an example embodiment, rolling bearing arrangement 12 includes housing 9; roller bearing arranged within housing 9, roller bearing including outer ring 1; unitary intermediate element 6 arranged between outer ring 1 and housing 9, unitary intermediate element 6 pressed onto outer ring 1 and forming gap 14 with housing 1, gap 14 operatively arranged to provide a rotational locking between housing 9 and unitary intermediate element 6; cooling recess 4 operatively arranged within unitary intermediate element 6 and contacting outer ring 1; and, damping recess 7 or 11 operatively arranged within housing 9 proximate gap 14.

Referring to FIG. 2, in an example embodiment, rolling bearing arrangement 12 includes housing 9; roller bearing arranged within housing 9, roller bearing including outer ring 1; unitary intermediate element 6 arranged between outer ring 1 and housing 9, unitary intermediate element 6 pressed onto outer ring 1 and forming gap 14 with housing 9, gap 14 operatively arranged to provide a rotational locking between housing 14 and unitary intermediate element 6; cooling recess 4 operatively arranged within rolling bearing outer ring 1 and contacting unitary intermediate element 6; and, damping recess 7 or 11 operatively arranged within housing 9 and contacting unitary intermediate element 6.

Adverting to FIG. 3, in an example embodiment, rolling bearing arrangement 12 includes housing 9; roller bearing arranged within housing 9, roller bearing including outer ring 1; unitary intermediate element 6 arranged between outer ring 1 and housing 9, unitary intermediate element 6 pressed onto outer ring 1 and forming gap 14 with housing 9, gap 14 operatively arranged to provide a rotational locking between housing 9 and unitary intermediate element 6; cooling recess 4 operatively arranged within rolling bearing outer ring 1 and contacting unitary intermediate element 6; and, damping recess 7 or 11 operatively arranged within unitary intermediate element 6 proximate housing 9.

Adverting to FIG. 4, in an example embodiment, rolling bearing arrangement 12 includes housing 9; roller bearing arranged within housing 9, roller bearing including outer ring 1; unitary intermediate element 6 arranged between outer ring 1 and housing 9, unitary intermediate element 6 pressed onto outer ring 1 and forming gap 14 with housing 9, gap 14 operatively arranged to provide a rotational locking between housing 9 and unitary intermediate element 6; cooling recess 4 operatively arranged within unitary intermediate element 6 and contacting outer ring 1; and, damping recess 7 or 11 operatively arranged within unitary intermediate element 6 proximate housing 9.

REFERENCE NUMBERS

1 Outer Rolling Bearing Ring or Outer Bearing Ring
2 Rolling Body
3 Spring Bars, Flange
4 Cooling Channel, e.g. Spiral
5 Cooling Oil Feed/Inlet and Cooling Oil Discharge/Outlet
6 Surrounding Ring
7 Encircling Groove/Pocket
8 Damper Oil Feed, Inlet
9 Housing or Housing Part
10 Flange Bore
11 Groove with Sealing Ring/Blocking Ring
12 Rolling Bearing Arrangement, Bearing System
13 Bearing Module
14 Gap
15 Outer Contour (of the Surrounding Ring 6)
16 Cavity Wall, Inner Contour of the Housing Part 9
17 Sealing Rings, Blocking Rings
18 Inner Contour (of the Surrounding Ring 6)
19 Outer Contour (of the Outer Rolling Bearing Ring 1)
20 Oil Pocket
21 Flow Limiter

The invention claimed is:

1. A rolling bearing arrangement, comprising:
a housing;
a roller bearing arranged within said housing, said roller bearing including an outer ring;
a unitary intermediate element arranged between said outer ring and said housing, said unitary intermediate element pressed onto said outer ring and forming a gap with said housing, said gap operatively arranged to provide a rotational locking between said housing and said unitary intermediate element;
a cooling recess operatively arranged within said unitary intermediate element and contacting said outer ring; and,
a damping recess operatively arranged within said housing proximate said gap.

2. The rolling bearing arrangement as claimed in claim 1, wherein the cooling recess is a cooling channel.

3. The rolling bearing arrangement as claimed in claim 1, wherein the damping recess is at least one groove which extends around in the housing.

4. The rolling bearing arrangement as claimed in claim 1, wherein the damping recess is at least one pocket arranged in the housing.

5. The rolling bearing arrangement as claimed in claim 4, wherein a plurality of the pockets is uniformly arranged in a circumferential direction in the housing.

6. The rolling bearing arrangement as claimed in claim 1, wherein said damping recess can be filled with a damping medium such as a damping fluid and said cooling recess can be filled with a coolant such as a cooling oil.

7. The rolling bearing arrangement as claimed in claim 6, wherein the damping fluid is oil.

8. The rolling bearing arrangement as claimed in claim 6, wherein the damping medium is introducible into the damping recess at a constant rate.

9. The rolling bearing arrangement as claimed in claim 8, wherein the damping medium is introducible into the damping recess by a flow limiter or a fixed displacement pump.

10. The rolling bearing arrangement as claimed in claim 1, wherein the housing has encircling recesses for accommodating at least one sealing or blocking element.

11. The rolling bearing arrangement as claimed in claim 10, wherein the encircling recesses are grooves.

12. The rolling bearing arrangement as claimed in claim 1, wherein the cooling recess is at least one spiral groove arranged in the unitary intermediate element.

13. The rolling bearing arrangement as claimed in claim 12, wherein the intermediate element has at least one coolant inlet and one coolant outlet, and the coolant inlet and the coolant outlet are in a throughflow connection with the cooling recess.

14. The rolling bearing arrangement as claimed in claim 13, wherein the coolant inlet and the coolant outlet are arranged on the intermediate element so that the coolant can flow through the cooling recess.

15. The rolling bearing arrangement as claimed in claim 1, wherein the housing has a plurality of inlets corresponding to a plurality of damping recesses, and a damping medium is introducible, via the inlets, into a damping cavity under pressure.

16. A rolling bearing arrangement, comprising:
a housing;
a roller bearing arranged within said housing, said roller bearing including an outer ring;
a unitary intermediate element arranged between said outer ring and said housing, said unitary intermediate element pressed onto said outer ring and forming a gap with said housing, said gap operatively arranged to provide a rotational locking between said housing and said unitary intermediate element;
a cooling recess operatively arranged within said rolling bearing outer ring and contacting said unitary intermediate element; and,
a damping recess operatively arranged within said housing and contacting said unitary intermediate element.

17. The rolling bearing arrangement as claimed in claim 16, wherein said cooling recess is a cooling channel.

18. The rolling bearing arrangement as claimed in claim 16, wherein said damping recess can be filled with a damping medium such as a damping fluid.

19. The rolling bearing arrangement as claimed in claim 16, wherein the cooling recess is at least one spiral groove arranged in the rolling bearing outer ring.

20. A rolling bearing arrangement, comprising:
a housing;
a roller bearing arranged within said housing, said roller bearing including an outer ring;
a unitary intermediate element arranged between said outer ring and said housing, said unitary intermediate element pressed onto said outer ring and forming a gap with said housing, said gap operatively arranged to provide a rotational locking between said housing and said unitary intermediate element;
a cooling recess operatively arranged within said rolling bearing outer ring and contacting said unitary intermediate element; and,
a damping recess operatively arranged within said unitary intermediate element proximate said housing.

21. The rolling bearing arrangement as claimed in claim 20, wherein said damping recess can be filled with a damping medium such as a damping fluid such as an oil.

22. The rolling bearing arrangement as claimed in claim 20, wherein the damping recess is at least one groove which extends around the intermediate element.

23. The rolling bearing arrangement as claimed in claim 20, wherein the damping recess is at least one pocket arranged in the intermediate element.

24. The rolling bearing arrangement as claimed in claim 20, wherein the intermediate element has encircling recesses for accommodating at least one sealing or blocking element.

25. A rolling bearing arrangement, comprising:
a housing;
a roller bearing arranged within said housing, said roller bearing including an outer ring;
a unitary intermediate element arranged between said outer ring and said housing, said unitary intermediate element pressed onto said outer ring and forming a gap with said housing, said gap operatively arranged to provide a rotational locking between said housing and said unitary intermediate element;
a cooling recess operatively arranged within said unitary intermediate element and contacting said outer ring; and,
a damping recess operatively arranged within said unitary intermediate element proximate said housing.

26. The rolling bearing arrangement as claimed in claim 25, wherein said damping recess can be filled with a damping medium such as a damping fluid such as an oil.

\* \* \* \* \*